(12) United States Patent
Yano et al.

(10) Patent No.: US 6,391,441 B1
(45) Date of Patent: May 21, 2002

(54) ADHESIVE POLYESTER FILM

(75) Inventors: Shinji Yano; Masayuki Fukuda; Satoshi Kitazawa, all of Sagamihara (JP)

(73) Assignee: Teijin Limited, Osaka (JP)

(*) Notice: Subject to any disclaimer, the term of this patent is extended or adjusted under 35 U.S.C. 154(b) by 0 days.

(21) Appl. No.: 09/341,459

(22) PCT Filed: Nov. 11, 1998

(86) PCT No.: PCT/JP98/05080

§ 371 Date: Jul. 12, 1999

§ 102(e) Date: Jul. 12, 1999

(87) PCT Pub. No.: WO99/25553

PCT Pub. Date: May 27, 1999

(30) Foreign Application Priority Data

Nov. 13, 1997 (JP) .............................. 9-312145
Nov. 13, 1997 (JP) .............................. 9-312146

(51) Int. Cl.$^7$ .............................. B32B 15/04
(52) U.S. Cl. .................. 428/343; 528/176; 528/193; 528/194
(58) Field of Search .................. 428/343; 528/176, 528/193, 194

(56) References Cited

U.S. PATENT DOCUMENTS 4,895,830 A 1/1990 Takeda et al. .............. 503/227

FOREIGN PATENT DOCUMENTS

| EP | 0 707 979 A2 | 4/1996 | ............ B41M/5/40 |
| EP | 0 779 326 A1 | 6/1997 | .............. C08J/7/04 |
| JP | A 1-171988 | 7/1989 | |
| JP | A 3-67695 | 3/1991 | |
| JP | A 3-106691 | 5/1991 | |
| JP | A 4-41297 | 2/1992 | |
| JP | A 8-2122 | 1/1996 | |
| JP | A 8-11447 | 1/1996 | |
| JP | A 8-104064 | 4/1996 | |
| JP | 9-175046 | 7/1997 | ............ B41M/5/38 |
| JP | A 9-175046 | 7/1997 | |

*Primary Examiner*—Terressa M. Boykin
(74) *Attorney, Agent, or Firm*—Sughrue Mion, PLLC

(57) ABSTRACT

An adhesive polyester film which comprises a biaxially oriented polyester film base layer and an adhesive layer and which is particularly useful as a base layer for a sublimation-type thermosensitive image transfer recording material. This base layer has no point at which the gradient of its temperature-dimensional change curve changes from a positive value to a negative value when temperature is elevated from the glass transition temperature of the polyester to 240° C. and does not show a dimensional change of more than 5%. The adhesive layer is made from (i) a water-soluble or water-dispersible resin of a polyester modified by a vinyl resin or (ii) a crosslinked resin of a mixture of a water-soluble or water-dispersible acrylic resin, a water-soluble or water-dispersible polyester resin and an epoxy resin crosslinking agent.

21 Claims, 2 Drawing Sheets

ADHESIVE POLYESTER FILM

TECHNICAL FIELD

The present invention relates to an adhesive polyester film. More specifically, it relates to an adhesive polyester film which has excellent adhesion particularly to a sublimable ink layer due to a specific coating layer formed thereon and is therefore suitably used for a sublimation-type thermosensitive image transfer recording medium.

BACKGROUND ART

A polyester film has been heretofore used in many fields due to its excellent properties such as mechanical properties, dimensional stability and heat resistance. One of its application fields is a base film for a heat sensitive transfer recording material.

Of heat sensitive transfer recording systems, the use of a sublimation-type thermosensitive image transfer recording system has been increasing rapidly as a recording system capable of outputting a high-quality full color image with ease. The sublimation-type thermosensitive image transfer recording system comprises heating a binder containing a thermal sublimable dye to sublime only a dye, which leaves the binder, and having the image receiving layer of a transferred paper absorb the dye to form a gradation image. In this system, high adhesion between the binder and the base film is required to sublime only the dye and there must not be any reduction in adhesion, which is caused by environmental changes or the elapse of time. If the adhesion is not enough, the binder layer is transferred to the transferred paper, thereby greatly impairing gradation and causing over-transfer.

In general, a polyester film has poor adhesion because of high crystal orientation and is not firmly bonded even when an ink layer is directly formed thereon. Therefore, to improve its adhesion to an ink layer, there is already known a method for applying a physical or chemical treatment to the surface of the film. This method, however, fails to provide sufficiently high adhesion.

A method for treating a film with a primer is widely used because it is very advantageous from the viewpoint of performance and processing. For example, there is known a method for treating a film with a primer such as a polyester resin, acrylic resin, urethane resin, or a mixture of these (see JP-A 8-104064), or a primer prepared by adding a crosslinking agent to the mixture (see JP-A 8-11447 and JP-A 9-175046).

The base film is required not only to be as thin as possible but also to have high strength. It is also required to have a small dimensional change when shrunk by heat at the time of printing.

JP-A 1-171988 discloses that a biaxially oriented polyester film for a sublimation-type thermosensitive image transfer recording material is obtained by applying a coating solution, which contains a reaction product obtained by polymerizing a compound having both a specific substituent and a polymerizable carbon-carbon double bond in an aqueous solution or water dispersion of a polyester, to at least one side of a polyester film and stretching the resulting film. Stated more specifically, the biaxially oriented polyester film is obtained by applying the coating solution to a monoaxially oriented film which has been stretched to 2 to 6 times at 60 to 130° C., stretching the coated film to 2 to 6 times in a direction perpendicular to the previous direction at 80 to 130° C., and heating the film at 150 to 250° C. for 1 to 600 seconds.

JP-A 3-67695 discloses a polyethylene terephthalate film or polyethylene naphthalate film having an adhesive layer, which has been simultaneously stretched and heated, as a base film for a thermal transfer sheet. As for the above simultaneous stretching and heating conditions, examples disclosed in this publication teach that the film is stretched to 4 times in a longitudinal direction at 80° C. and then to 4 times in a transverse direction at 110° C. and heated at 210° C.

JP-A 3-106691 discloses a biaxially oriented polyester film having an adhesive layer as a base film for a thermal transfer sheet. The publication discloses no specific conditions for biaxial stretching.

The above prior arts have the following problems.

A coating film of an ordinary polyester, acrylic or urethane resin or of a mixture of a polyester resin and an acrylic resin is inferior in moisture resistance, water resistance, solvent resistance and blocking resistance although the coating film provides desired adhesion. Although desired adhesion, moisture resistance, water resistance, solvent resistance and blocking resistance can be provided by adding a general crosslinking agent to a mixture of a polyester resin and an acrylic resin, the pot life of a coating in a production process becomes short and it is difficult to handle it. For example, because a melamine-based crosslinking agent has very high reactivity, a crosslinking reaction proceeds at normal temperature, thereby shortening the pot life of a coating and making it difficult to control the quality of the coating solution in a production process. There is also another problem with regard to the dyeing affinity of a sublimable dye for an adhesive layer. Efforts have recently been made to increase the speed of printing. This requires that a higher temperature be applied momentarily. Therefore, an adhesive layer must have heat resistance and adhesion to an ink layer at the time of heating. If adhesion is low, color density and gradation become insufficient. An increase in printing speed increases the quantity of heat received by a transfer recording material, which causes such problems as the large deformation of a film used as a base material, an unclear image, a wrinkled film or, in an extreme case, a printing failure.

DISCLOSURE OF THE INVENTION

It is an object of the present invention to provide an adhesive polyester film.

It is another object of the present invention to provide an adhesive polyester film suitable for use as a base film for a sublimation-type thermosensitive image transfer recording medium.

It is still another object of the present invention to provide an adhesive polyester film suitable for use as a base film for a sublimation-type thermosensitive image transfer recording medium, which has excellent adhesion to a sublimable ink layer, which suppresses the dyeing affinity of a sublimable dye for an adhesive layer, which has small deformation when heated and which provides a transfer image having excellent gradation.

Other objects and advantages of the present invention will become apparent from the following description.

According to the present invention, the above objects and advantages of the present invention are attained by an adhesive polyester film comprising:

(a) a biaxially oriented polyester film base layer which has no point at which the gradient of its temperature-dimensional change curve changes from a positive value to a negative value when temperature is elevated from the glass transition temperature of the polyester to 240° C. and which does not show a dimensional change of more than 5%, and (b) an adhesive layer formed on at least one side of the base layer and comprising a resin selected from the group consisting of:

(i) a water-soluble or water-dispersible resin of a polyester modified by a vinyl resin, and (ii) a crosslinked resin of a mixture of a water-soluble or water-dispersible acrylic resin, a water-soluble or water-dispersible polyester resin and an epoxy resin crosslinking agent.

DETAILED DESCRIPTION OF THE INVENTION

Figure 1:
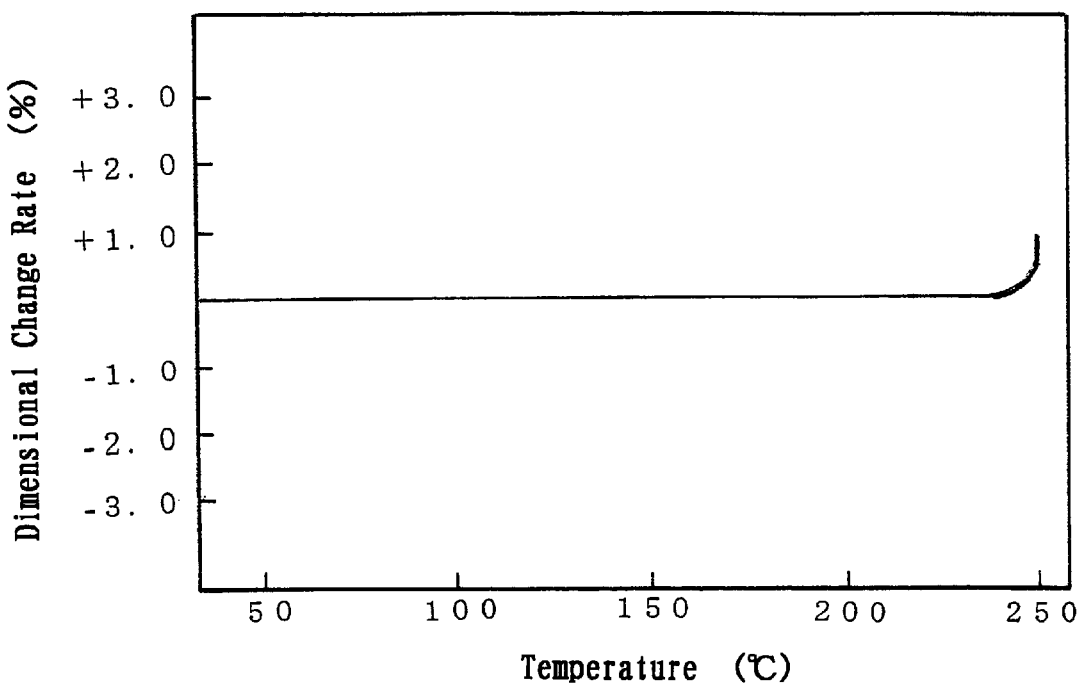
FIG. 1 shows the temperature-dimensional change curve in the transverse direction of a film obtained in Example 1 when temperature is elevated from 0 to 240° C.

The present invention will be described in detail hereunder.

The polyester constituting the biaxially oriented polyester film base layer of the present invention is a linear saturated polyester synthesized from an aromatic dibasic acid or its ester-forming derivative and a diol or its ester-forming derivative.

Illustrative examples of recurring units constituting the polyester include ethylene terephthalate, ethylene isophthalate, butylene terephthalate, 1,4-cyclohexylene dimethylene terephthalate and polyethylene-2,6-naphthalene dicarboxylate. The polyester may be a homopolymer or copolymer comprising these recurring units, or a mixture of the homopolymer or copolymer and a slight amount of other resin. Of these, polyethylene terephthalate is preferable, and polyethylene-2,6-naphthalene dicarboxylate is more preferable to make the base layer thinner and to improve the heat resistance of the base layer.

The polyester used in the present invention preferably contains an inorganic or organic lubricant having a particle diameter of 0.1 to 5 $\mu$m, such as silicon dioxide, calcium carbonate, alumina, kaolin or silicone particles, in an amount of 0.03 to 3.0 wt %, more preferably 0.1 to 1.0 wt %. A polyester film having a center line average roughness of an adhesive layer surface of 0.01 to 1 $\mu$m can be obtained by adding the lubricant. If the center line average roughness is smaller than 0.01 $\mu$m, sufficient slipperiness cannot be obtained with the result that the obtained film is wrinkled or sticking occurs in a thermal head. If the center line average roughness is larger than 1 $\mu$m, a satisfactory image cannot be obtained due to low heat conductivity at the time of printing.

The polyester used in the present invention may contain a stabilizer, colorant, antioxidant and other additive as required in such amounts that do not impair inherent performance thereof.

The polyester film of the present invention can be produced by melt-extruding the above polyester into a film, quenching and solidifying the film by winding it round a casting drum to give an unstretched film, stretching the unstretched film one or more times to a total stretching ratio of 3 to 7 times in a longitudinal direction at a temperature of Tg to (Tg+60)° C., stretching the film to a total stretching ratio of 3 to 5 times in a transverse direction at Tg to (Tg+60)° C., heating the biaxially oriented film at (Tg+50) to (Tg+140)° C. for 1 to 100 seconds, and heating it again while it is being shrunk or extended in a transverse direction by 0 to 3%.

The adhesive polyester film (base layer) of the present invention has no point at which the gradient of its temperature-dimensional change curve changes from a positive value to a negative value when temperature is elevated from the glass transition temperature of the polyester to 240° C. and does not show a dimensional change of more than 5%.

The measurement of the temperature-dimensional change curve in a transverse direction of a known biaxially oriented polyester film shows that there is a point at which the gradient of the curve changes from a negative value to a positive value and a point at which it changes from a positive value to a negative value (see JP-A 4-41297). If this film is used for sublimation-type thermosensitive image transfer, the distortion of the film becomes non-uniform, thereby deteriorating resolution. Furthermore, if the maximum value of dimensional change exceeds 5%, that is, the film shrinks by more than 5% of its original size, the shrinkage of the film becomes large at the time of printing, whereby the film wrinkles and printing cannot be done. On the other hand, if the film extends by more than 5% of its original size, the film slackens at the time of printing, thereby deteriorating resolution.

On the other hand, the adhesive polyester film for sublimation-type thermosensitive image transfer of the present invention is advantageous for high-resolution printing because the heat distortion of the film is uniform.

The temperature-dimensional change curve of the film in the present invention is a curve showing the dimensional change rate of the original length of a 15-mm-long and 4-mm-wide film as a function of temperature when the film is heated from 0° C. to 240° C. at a rate of 5° C./min under a load of 5 g with its both ends in a transverse direction held.

It is preferable that the polyester film used as a base layer in the present invention have no point at which the gradient of its temperature-dimensional change curve changes from a positive value to a negative value when temperature is elevated from 0° C. to 240° C. and does not show a dimensional change of more than 5%. It is more preferable that the polyester film should not show a dimensional change of more than 2% in the temperature-dimensional change curve, and it is particularly preferable that the polyester film have the gradient of the temperature-dimensional change curve between +0.02%/° C. and −0.02%/° C.

The adhesive polyester film of the present invention preferably has a thickness of 0.5 to 10 $\mu$m, more preferably 1 to 5 $\mu$m. Due to a recent tendency toward a reduction in the size of a printer and an increase in printing speed, a very thin film has been desired. Therefore, the adhesive polyester film is preferably as thin as possible. For example, while it is difficult to produce a polyethylene terephthalate film of less than 1.5 $\mu$m in thickness, a polyethylene-2,6-naphthalate film, which has higher strength than the polyethylene terephthalate film, is preferable because a film of 0.5 $\mu$m in thickness can be produced from it. If the thickness of the film is larger than 10 μm, heat conductivity at the time of printing deteriorates, thereby making high-speed printing impossible.

The adhesive polyester film of the present invention preferably has a thickness non-uniformity in longitudinal and transverse directions of 0 to 5%, more preferably 0 to 2%. If the thickness non-uniformity is larger than 5%, a uniform back coat or a uniform sublimable ink layer cannot be formed, thereby deteriorating the traveling properties at the time of printing and printing resolution of the film.

The adhesive polyester film of the present invention preferably has an refractive index in longitudinal and transverse directions of 1.600 to 1.800. If the refractive index is smaller than 1.600, mechanical strength lowers and elongation at the time of printing becomes large. On the other hand, if the refractive index is larger than 1.800, the film has high orientation and is therefore easily broken.

The adhesive polyester film of the present invention preferably has an F5 value in a longitudinal direction of 10 to 16 kg/mm$^2$. If the F5 value in a longitudinal direction is smaller than 10 kg/mm$^2$, the elasticity of the film is hard to recover due to low strength and the elongation of the film occurs, thereby deteriorating printability. On the other hand, if the F5 value in a longitudinal direction is larger than 16 kg/mm$^2$, the film is broken at the time of printing due to high rigidity.

The F5 value of the film indicates stress at the time of 5% elongation when a 10-mm-wide and 150-mm-long film is pulled at a chuck interval of 100 mm, a pulling speed of 10 mm/min and a chart speed of 100 mm/min.

The adhesive polyester film of the present invention has an adhesive layer, which is made from a resin selected from the group consisting of (i) a water-soluble or water-dispersible resin of a polyester modified by a vinyl resin and (ii) a crosslinked resin of a mixture of a water-soluble or water-dispersible acrylic resin, water-soluble or water-dispersible polyester resin and an epoxy resin crosslinking agent, on at least one side of a polyester film which is a base layer. This adhesive layer is necessary, for example, to improve adhesion between the ink layer, which comprises sublimable ink for sublimation-type thermosensitive image transfer and a resin binder, and the polyester film.

The water-soluble or water-dispersible resin (i) of a polyester modified by a vinyl resin, which constitutes the adhesive layer of the present invention can be synthesized, for example, by copolymerizing two or more vinyl monomers in an aqueous solution or water dispersion of a polyester.

The component constituting the polyester is exemplified by the following polybasic acids or ester-forming derivatives thereof and the following polyols or ester-forming derivatives thereof. That is, specific examples of the polybasic acid component include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid and dimer acid. Two or more of these acid components may be used to synthesize a copolyester resin. An unsaturated polybasic acid component such as maleic acid or itaconic acid or a hydroxycarboxylic acid such as p-hydroxybenzoic acid may also be used in a slight amount. Specific examples of the polyol component include ethylene glycol, 1,4-butanediol, diethylene glycol, dipropylene glycol, 1,6-hexanediol, 1,4-cyclohexane dimethanol, xylene glycol, dimethylolpropane, poly(ethylene oxide)glycol and poly(tetramethylene oxide) glycol. They may be used in combination of two or more.

The vinyl resin component is exemplified by the following vinyl monomers. That is, the vinyl monomers include alkyl acrylates and alkyl methacrylates (the alkyl group is exemplified by methyl, ethyl, n-propyl, isopropyl, n-butyl, isobutyl, t-butyl, 2-ethylhexyl and cyclohexyl); hydroxyl group-containing monomers such as 2-hydroxyethyl acrylate, 2-hydroxyethyl methacrylate, 2-hydroxypropyl acrylate and 2-hydroxypropyl methacrylate; amide group-containing monomers such as acrylamide, methacrylamide, N-alkylacrylamide, N-alkylmethacrylamide, N,N-dialkylacrylamide, N,N-dialkylmethacrylamide (the alkyl group is exemplified by methyl, ethyl, n-propyl, isopropyl, n-butyl, isobutyl, t-butyl, 2-ethylhexyl and cyclohexyl), N-alkoxyacrylamide, N-alkoxymethacrylamide, N,N-dialkoxyacrylamide, N,N-dialkoxymethacrylamide (the alkoxy group is exemplified by methoxy, ethoxy, butoxy and isobutoxy), N-methylolacrylamide, N-methylolmethacrylamide, N-phenylacrylamide and N-phenylmethacrylamide; epoxy group-containing monomers such as glycidyl acrylate, glycidyl methacrylate and allyl glycidyl ether; monomers having a carboxyl group or a salt thereof such as acrylic acid, methacrylic acid, itaconic acid, maleic acid, fumaric acid, crotonic acid, styrene-sulfonic acid and salts thereof (such as sodium salts, potassium salts, ammonium salts and tertiary amine salts); monomers of acid anhydrides such as maleic anhydride and itaconic anhydride; and monomers such as vinyl isocyanate, allyl isocyanate, styrene, α-methylstyrene, vinyl methyl ether, vinyl ethyl ether, vinyl trialkoxysilane, alkyl maleic acid monoesters, alkyl fumaric acid monoesters, alkyl itaconic acid monoesters, acrylonitrile, methacrylonitrile, vinylidene chloride, ethylene, propylene, vinyl chloride, vinyl acetate and butadiene. One or more of the above monomers may be copolymerized.

The present invention is not limited to the above monomers.

Of these, the water-soluble or water-dispersible resin of a polyester modified by a vinyl resin is preferably a resin comprising a vinyl resin, which is composed of methyl methacrylate, isobutyl methacrylate, acrylic acid, methacrylic acid and glycidyl methacrylate, and a copolyester, which is composed of terephthalic acid, isophthalic acid, 5-sodium sulfoisophthalic acid, ethylene glycol and neopentyl glycol.

The water-soluble or water-dispersible acrylic resin constituting the crosslinked resin (ii) in the present invention is a copolymer obtained by copolymerizing two or more of the following monomers.

That is, the monomers include acrylic monomers having a hydroxyl group such as 2-hydroxyethyl acrylate, 2-hydroxyethyl methacrylate, 2-hydroxypropyl acrylate and 2-hydroxypropyl methacrylate; acrylic ester-based monomers such as alkyl acrylates and alkyl methacrylates (the alkyl group is exemplified by methyl, ethyl, n-propyl, isopropyl, n-butyl, isobutyl, t-butyl, 2-ethylhexyl and cyclohexyl); amide group-containing monomers such as acrylamide, methacrylamide, N-alkylacrylamide, N-alkylmethacrylamide, N,N-dialkylacrylamide, N,N-dialkylmethacrylamide (the alkyl group is exemplified by methyl, ethyl, n-propyl, isopropyl, n-butyl, isobutyl, t-butyl, 2-ethylhexyl and cyclohexyl), N-alkoxyacrylamide, N-alkoxymethacrylamide, N,N-dialkoxyacrylamide, N,N-dialkoxymethacrylamide (the alkoxy group is exemplified by methoxy, ethoxy, butoxy and isobutoxy), N-methylolacrylamide, N-methylolmethacrylamide, N-phenylacrylamide and N-phenylmethacrylamide; glycidyl group-containing monomers such as glycidyl acrylate, glycidyl methacrylate and allyl glycidyl ethers; and monomers such as vinyl isocyanate, allyl isocyanate, styrene, α-methylstyrene, vinyl methyl ether, vinyl ethyl ether, vinyl trialkoxysilane, alkyl maleic acid monoesters, alkyl fumaric acid monoesters, alkyl itaconic acid monoesters, acrylonitrile, methacrylonitrile, vinylidene chloride, ethylene, propylene, vinyl chloride, vinyl acetate and butadiene.

The main ingredients of the monomers constituting the copolymer are preferably methyl methacrylate (MMA) and ethyl acrylate (EA). The molar ratio of MMA/EA is preferably in the range of 0.5 to 3, more preferably 0.7 to 2.5. The total weight of MMA and EA is preferably 50 to 98 mol %, more preferably 80 to 96 mol %, based on the total weight of all the monomers.

The water-soluble or water-dispersible acrylic resin constituting the adhesive layer in the present invention preferably contains a hydroxyl group. The amount of the hydroxyl group-containing monomer is preferably 0.5 to 15 mol %, more preferably 1 to 10 mol %.

It is particularly preferable that the water-soluble or water-dispersible acrylic resin have no free carboxyl group.

The preferred component of the water-soluble or water-dispersible polyester resin constituting the adhesive layer in the present invention is exemplified by the following polybasic acids or ester-forming derivatives thereof and the following polyols or ester-forming derivatives thereof.

That is, specific examples of the polybasic acid component include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid and dimer acid. Two or more of these acid components are used to synthesize a copolyester resin. An unsaturated polybasic acid component such as maleic acid or itaconic acid or a hydroxycarboxylic acid such as p-hydroxybenzoic acid may be used in a slight amount.

Specific examples of the polyol component include ethylene glycol, 1,4-butanediol, diethylene glycol, dipropylene glycol, 1,6-hexanediol, 1,4-cyclohexane dimethanol, xylene glycol, dimethylol propane, poly(ethylene oxide)glycol and poly(tetramethylene oxide)glycol. These polyol components may be used alone or in combination of two or more.

A copolyester comprising terephthalic acid, isophthalic acid, ethylene glycol and diethylene glycol out of those listed above is preferred.

Further, the epoxy resin crosslinking agent constituting the adhesive layer in the present invention is preferably a glycidylamine compound. The glycidylamine compound is a compound having at least one tertiary amine group and at least two glycidyl groups in a molecule and is preferably selected from the following three compounds.

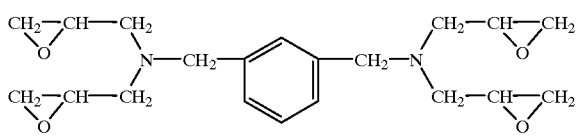

(1)

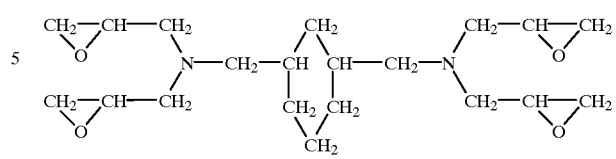

(2)

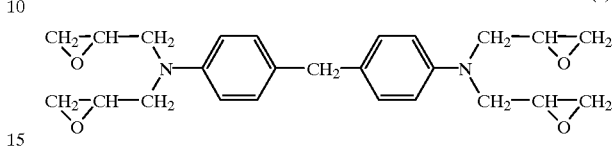

(3)

In addition to the above compounds, a slight amount of a water-soluble or water-dispersible polyglycidyl compound such as a trimethylol propane triglycidyl ether or glycerin triglycidyl ether may be used. A compound (reaction promoting compound) for promoting a reaction between a hydroxyl group and a glycidyl group may also be used. The reaction promoting compound is exemplified by tertiary amino group-containing compounds, compounds having a nitrogen-containing ring structure and salts thereof, and quaternary ammonium salt compounds such as tri-n-butylamine, dimethylaminobenzene, 2,4,6-tris(dimethylaminomethyl)phenol, 2-methylimidazole and tetramethylammonium chloride.

The weight ratio of the water-soluble or water-dispersible acrylic resin, the water-soluble or water-dispersible polyester resin and the epoxy resin crosslinking agent in the crosslinked resin forming the adhesive layer in the present invention preferably satisfies the following expressions (1) and (2).

$$0.25 \leq (A)/(B) \leq 4.0 \quad (1)$$

$$1.5 \leq \{(A)/(B)\}/(C) \leq 199 \quad (2)$$

wherein (A), (B) and (C) signify parts by weight of the water-soluble or water-dispersible acrylic resin, parts by weight of the water-soluble or water-dispersible polyester resin and parts by weight of the epoxy resin crosslinking agent, respectively.

If the weight ratio (A)/(B) of the expression (1) is smaller than 0.25, adhesion to the ink layer is liable to be insufficient, while adhesion to the polyester film is satisfactory. On the other hand, if the weight ratio (A) (B) is larger than 4.00, adhesion to the polyester film is liable to deteriorate, while adhesion to the ink layer is satisfactory.

If the weight ratio {(A)/(B)}/(C) of the expression (2) is larger than 199, the crosslinking of the adhesive layer becomes incomplete, thereby deteriorating moisture resistance, water resistance, solvent resistance and blocking resistance. On the other hand, if the weight ratio {(A)/(B)}/(C) is smaller than 1.5, blocking may occur due to unreacted crosslinking agent molecules remaining in the adhesive layer, or adhesion deteriorates due to the influence of a sticking-preventing layer formed on a side opposite to the adhesive layer.

The thickness of the adhesive layer of the present invention is preferably in the range of 0.001 to 1 μm, more preferably 0.01 to 0.5 μm. If the thickness of the adhesive layer is smaller than 0.001 μm, adhesion between the ink layer and the polyester film becomes insufficient. On the other hand, if the thickness of the adhesive layer is larger than 1 μm, blocking is liable to occur when a film having an adhesive layer formed thereon is rolled, or sufficient color density or gradation is difficult to obtain due to the dyeing of a sublimable dye on the adhesive layer.

The surface tension of the surface of the adhesive layer of the present invention is preferably in the range of 35 to 75 dyne/cm, more preferably 40 to 70 dyne/cm. If the surface tension of the adhesive layer surface is smaller than 35 dyne/cm, a coating solution comprising a sublimable dye and a resin binder is repelled when coated, thereby making it difficult to form a uniform layer. On the other hand, if the surface tension of the adhesive layer surface is larger than 75 dyne/cm, hydrophilic nature increases and adhesion to the ink layer deteriorates.

The adhesive layer of the present invention preferably has a degree of swelling of 5 to 500%, more preferably 10 to 400%, for a mixture comprising methyl ethyl ketone and toluene in a weight ratio of 1:1.

The ring and ball softening point of the adhesive layer of the present invention is preferably in the range of 50 to 250° C., more preferably 100 to 250° C. If the ring and ball softening point of the adhesive layer is lower than 50° C., the ink layer is peeled off by heating at the time of printing, thereby making printing difficult. If the ring and ball softening point of the coating layer is higher than 250° C., the coating film becomes hard, rigidity lowers, adhesion between the base film and the coating layer becomes insufficient, and adhesion to the ink layer is not obtained, thereby making it difficult to form an ink ribbon.

If the degree of swelling is smaller than 5%, adhesion between the base film and the ink layer becomes insufficient. On the other hand, if the degree of swelling is larger than 500%, the ink layer is apt to lose solvent resistance with the result that the coating layer may peel off from the polyester film at the time of forming the ink layer by coating and that sufficient adhesion is hardly obtained.

The coating solution of the adhesive layer of the present invention may contain a slight amount of an organic solvent. This coating solution may contain a required amount of a surfactant such as an anionic surfactant, cationic surfactant or nonionic surfactant. The surfactant is preferably capable of reducing the surface tension of an aqueous coating solution to 40 dyne/cm or less and promoting the wetting of the polyester film, as exemplified by polyoxyethylene alkylphenyl ethers, polyoxyethylene-fatty acid esters, sorbitan fatty acid esters, glycerin fatty acid esters, fatty acid metallic soap, alkylsulfuric acid salts, alkylsulfonic acid salts, alkylsulfosuccinic acid salts, quaternary ammonium chloride salts, alkylamine hydrochloric acid and betaine surfactants. The coating solution may also contain other additives such as an antistatic agent, ultraviolet absorber, pigment, organic filler, inorganic filler, lubricant and antiblocking agent within limits that do not impair the effect of the present invention.

The adhesive layer of the present invention is formed by applying the coating solution on at least one side of the polyester film.

A known coating means may be used to apply the adhesive coating solution. Coating may be carried out separately from the production process of the polyester film or may be carried out during the production process of the polyester film. To carrying out coating in a clean environment where a dust, which causes a defect at the time of printing, is hardly contained and to form the coating film at a relatively low cost, it is preferable to employ a method that comprises applying the coating solution during the production process of the polyester film, that is, a method that comprises applying the coating solution on at least one side of the polyester film before the completion of crystal orientation, drying the coating solution, and stretching and heating the coated polyester film.

In this case, the solid content of the coating solution is preferably 0.1 to 30 wt %, more preferably 1 to 10 wt %. The amount of coating is preferably 0.5 to 50 g per $m^2$ of the running film.

Known coating means may be used. For examples, roll coating, gravure coating, roll brush coating, spray coating, air-knife coating, impregnation and curtain coating may be used alone or in combination.

EXAMPLES

The following examples are provided for the purpose of further illustrating the present invention but are in no way to be taken as limiting without departing from the scope of the present invention. Property values were measured in accordance with the following methods.

(1) Temperature-dimensional Change Curve

A sample which is 15 mm in length, 4 mm in width and 0.5 to 10 $\mu$m in thickness is measured using a thermal technical analyzer (TMA/SS120C of Seiko Instruments Inc.) and a quartz holder at a measurement temperature range of 0 to 280° C. and a temperature elevation rate of 5° C./min under a load of 5 g.

(2) Film Thickness

The weight of a film is measured to calculate the thickness of the film from the density of a polyester.

(3) Film Thickness Non-uniformity

The thickness in longitudinal and transverse directions of a polyester film is measured by a continuous film thickness meter (using an electronic micrometer) and thickness non-uniformity per 5 m of the film is calculated from the following equation.

thickness non-uniformity=[(maximum film thickness−minimum film thickness)/average film thickness]×100

(4) Refractive Index

This is measured using an Abbe's refractometer whose light source is sodium D-rays (589 nm). Methylene iodide is used as a mount solution and measurement is carried out at 25° C. and 65% RH.

(5) Center Line Average Roughness (Ra) of Coating Layer Surface

The center line average roughness (Ra) is defined by JIS B0601 and measured using the tracer-type surface roughness meter SURFCORDER SE-30C of Kosaka Laboratory Co., Ltd. in the present invention. The measurement conditions are as follows.

(a) radius of tracer tip: 2 $\mu$m
(b) measurement pressure: 30 mg
(c) cut-off: 0.25 mm
(d) measurement length: 2.5 mm
(e) data filing: The surface roughness of the same sample is measured 5 times and the average of four measurement values excluding the largest value is taken as Ra.

(6) F5 Value

A 10-mm-wide and 15-cm-long sample is cut out of a film and pulled by an Instron-type universal tensile tester at a chuck interval of 100 mm, a pulling speed of 10 mm/min and a chart speed of 100 mm/min to measure stress at the time of 5% elongation.

(7) Thickness of Coating Layer

This is calculated from the amount of the coating solution applied per $m^2$ and the solid content thereof.

(8) Surface Tension

The surface tension of the adhesive layer surface is measured at 23° C. and 50% RH in accordance with the JIS K 6768 method. That is, formamide and ethylene glycol monoethyl ethers are mixed in predetermined ratios to prepare a plurality of mixtures having different surface tensions at intervals of 1 dyne/cm, and a slight amount of a dye with high dyeing power is added to each of the mixtures to prepare reference solutions. Absorbent cotton (15 to 20 mg) is uniformly wound around the tip of a 1-mm-diameter rod to a length of 15 to 20 mm. After the tip of the rod is fully immersed in each of the above reference solutions to allow the cotton to absorb the solution in such an amount that the solution does not drop, the rod is applied to the sample horizontally and moved in one direction in such a manner that the formed coating film becomes as wide as possible and the area of the coating film becomes 6 cm². Coating should be completed in 0.5 sec.

(9) Degree of Swelling

A 5-g dried solid is prepared by drying the coating solution and immersed in a mixed solvent of methyl ethyl ketone and toluene (weight ratio of 1/1) at room temperature (23° C.) for 24 hours. The degree of swelling is calculated from the weights of the dry solid before and after immersion based on the following equation.

degree of swelling=[(weight of dry solid after immersion−weight of dry solid)/weight of dry solid×100]

(10) Ring and Ball Softening Point

A dry solid is prepared by drying the coating solution and the softening point of the dry solid is measured in accordance with JIS K-2531-1960. Glycerin is used as a heating bath solution and the temperature elevation rate is about 5° C./min.

(11) Adhesion Between Sublimable Ink Binder and Polyester Film (Adhesion 1)

A sublimable ink binder (4.5 wt % of C.I. Solvent Blue 22, 4.5 wt % of polyvinylacetal resin, 45.5 wt % of methyl ethyl ketone and 45.5 wt % of toluene) is coated on an adhesive surface and dried. The coated surface is then dried at 80° C. for 1 minute to fix an ink layer. Thereafter, the mending tape 810 of Sumitomo 3M Limited is affixed to the ink layer and peeled off quickly to evaluate the adhesion of the ink layer according to the degree of peeling of the ink layer based on the following criteria.

5; ink layer does not peel off at all
4; peeled area of ink layer is less than 10%
3; peeled area of ink layer is 10% or more and less than 30%
2; peeled area of ink layer is 30% or more and less than 80%
1; peeled area of ink layer is 80% or more

(12) Adhesion Between Sublimable Ink Binder and Polyester Film (Adhesion 2)

After a sublimable ink layer is formed in the same manner as in (11) above and left to stand at 60° C. for 7 days, adhesion thereof is evaluated based on the same criteria as in (11).

(13) Adhesion Between Sublimable Ink Binder and Polyester Film (Adhesion 3)

After a sublimable ink layer is formed in the same manner as in (11) above and left to stand at 40° C. and 90% RH for 7 days, adhesion thereof is evaluated based on the same criteria as in (11).

(14) Glass Transition Point Tg

This is measured using the DSC (differential scanning calorimeter) of PERKIN ELMER Co., Ltd. Ten milligrams of a sample are set in the DSC, molten at 300° C. for 5 minutes and quenched in liquid nitrogen. The temperature of this quenched sample is elevated at a rate of 10° C./min to detect a glass transition temperature Tg thereof.

The compositions of coating solutions used in Examples and Comparative Examples are as follows.

<coating solution 1>

The composition of coating solution 1 is as follows. The coating solution 1 consists of 90 parts by weight, in terms of solid content, of the resin of a polyester modified by a vinyl resin as a main ingredient, comprising (45 parts by weight of) a vinyl resin which is composed of 65 mol % of methyl methacrylate, 20 mol % of isobutyl methacrylate, 5 mol % of acrylic acid, 5 mol % of methacrylic acid and 5 mol % of glycidyl methacrylate and (45 parts by weight of) a polyester which is composed of 35% of terephthalic acid, 10 mol % of isophthalic acid and 5 mol% of 5-sodium sulfoisophthalic acid as acid components and 45 mol % of ethylene glycol and 5 mol % of neopentyl glycol as glycol components; and 10 parts by weight in terms of solid content of polyoxyethylene nonylphenyl ether as a wetting agent.

<coating solution 2>

The composition of coating solution 2 is as follows. The coating solution 2 consists of 81 parts by weight, in terms of solid content, of an urethane resin (Hydran AP-20 of Dainippon Ink and Chemicals, Inc.) as a main ingredient, 9 parts by weight in terms of solid content of triethylene glycol diglycidyl ether as a crosslinking agent and 10 parts by weight in terms of solid content of polyoxyethylene nonylphenyl ether as a wetting agent.

<coating solution 3>

The composition of coating solution 3 is as follows. The coating solution 3 is a mixture consisting of: 42 parts by weight in terms of solid content of a water-soluble or water-dispersible acrylic resin (A): 65 mol % of methyl methacrylate, 28 mol % of ethyl acrylate, 2 mol % of 2-hydroxyethyl methacrylate and 5 mol % of N-methylolacrylamide, 42 parts by weight in terms of solid content of a water-soluble or water-dispersible polyester resin (B): 35 mol % of terephthalic acid, 13 mol % of isophthalic acid and 2 mol % of 5-sodium sulfoisophthalic acid as acid components and 45 mol % of ethylene glycol and 5 mol % of diethylene glycol as glycol components, 6 parts by weight in terms of solid content of an epoxy-based crosslinking agent (C): N,N,N',N'-tetraglycidyl-m-xylylenediamine, and 10 parts by weight in terms of solid content of a wetting agent: polyoxyethylene nonylphenyl ether.

<coating solution 4>

The composition of coating solution 4 is as follows.

The coating solution 4 has the same composition as the coating solution 3 except that the epoxy-based crosslinking agent (C) is not contained and is a mixture consisting of 45 parts by weight in terms of solid content of the water-soluble or water-dispersible acrylic resin (A), 45 parts by weight in terms of solid content of the water-soluble or water-dispersible polyester resin (B) and 10 parts by weight in terms of solid content of polyoxyethylene nonylphenyl ether as a wetting agent.

<coating solution 5>

The composition of coating solution 5 is as follows. The coating solution 5 is a mixture consisting of:

40 parts by weight in terms of solid content of a water-soluble or water-dispersible acrylic resin (A): 75 mol % of methyl methacrylate, 22 mol % of ethyl acrylate, 1 mol % of acrylic acid and 2 mol % of N-methylolacrylamide, 40 parts by weight in terms of solid content of a water-soluble or water-dispersible polyester resin (B): 30 mol % of terephthalic acid, 15 mol % of isophthalic acid and 5 mol % of 5-sodium sulfoisophthalic acid as acid components and 30 mol % of ethylene glycol and 20 mol % of 1,4-butanediol as glycol components, 10 parts by weight in terms of solid content of methylol melamine, which is a melamine-based compound, as a crosslinking agent, and 10 parts by weight in terms of solid content of polyoxyethylene nonylphenyl ether as a wetting agent.

EXAMPLE 1

Polyethylene terephthalate (containing a lubricant) having an intrinsic viscosity, measured in o-chlorophenol at 25° C., of 0.61 was extruded from a T die and quenched on a rotary cooling drum maintained at about 40° C. while static electricity was applied to the polyethylene terephthalate to give an unstretched film. The unstretched film was then stretched to 3.6 times in a longitudinal direction at 115° C. to give a monoaxially stretched film. The coating solution 1 having a solid content of 3 wt % was applied to one side of the monoaxially stretched film by kiss-roll coating in an amount of 2.7 g/m$^2$. Thereafter, the film was stretched to 3.8 times in a transverse direction at 120° C., heated to be tense at 230° C. with a fixed length and heated again at 230° C. without stretching or shrinking in a transverse direction to give a 4.5-μm-thick biaxially oriented polyester film. The temperature-dimensional change curve in a transverse direction of this film is shown in FIG. 1 and other characteristic properties are shown in Table 1. There was no point at which the gradient of the temperature-dimensional change curve in a transverse direction changes from a positive value to a negative value and the maximum value of dimensional change was very small at 0.5% or less.

EXAMPLE 2

Polyethylene naphthalate (containing a lubricant) having an intrinsic viscosity, measured in o-chlorophenol at 25° C., of 0.61 was extruded from a T die and quenched on a rotary cooling drum maintained at about 40° C. while static electricity was applied to the polyethylene naphthalate to give an unstretched film. The unstretched film was stretched to 3.6 times in a longitudinal direction at 125° C. to give a monoaxially oriented film. The coating solution 1 having a solid content of 3 wt % was applied to one side of this monoaxially oriented film by kiss-roll coating in an amount of 2.7 g/m$^2$. Thereafter, the film was stretched to 3.8 times in a transverse direction at 140° C., heated to be tense at 240° C. with a fixed length and heated again at 240° C. without stretching and shrinking in a transverse direction to give a 4.5-μm-thick biaxially oriented polyester film.

The characteristic properties of this film are shown in Table 1. The temperature-dimensional change curve in a transverse direction of this film is almost the same as that of Example 1 (FIG. 1) and the maximum value of dimensional change was very small at 0.5% or less.

Comparative Example 1

A film was formed in the same manner as in Example 1 to give a biaxially oriented polyester film except that an adhesive layer was not formed. The characteristic properties of this film are shown in Table 1.

Comparative Example 2

A film was formed in the same manner as in Example 1 to give a biaxially oriented polyester film except that the coating solution 2 was used in place of the coating solution 1. The characteristic properties of this film are shown in Table 1.

Comparative Example 3

Figure 2:
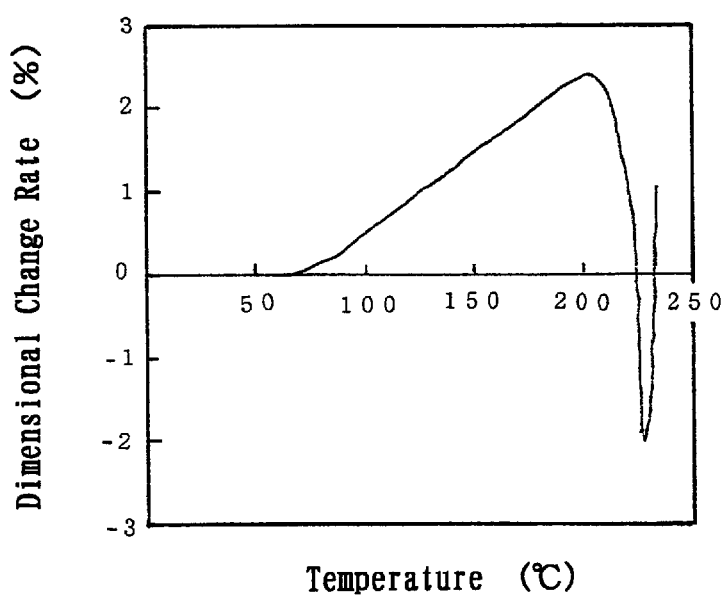
FIG. 2 shows the temperature-dimensional change curve in the transverse direction of a film obtained in Comparative Example 3 when temperature is elevated from 0 to 240° C.

Polyethylene terephthalate (containing a lubricant) having an intrinsic viscosity, measured in o-chlorophenol at 25° C., of 0.61 was extruded from a T die and quenched on a rotary cooling drum maintained at about 40° C. while static electricity was applied to the polyethylene terephthalate to give an unstretched film. The unstretched film was then stretched to 3.6 times in a longitudinal direction at 115° C. to give a monoaxially oriented film. The coating solution 1 having a solid content of 3 wt % was applied to one side of this monoaxially oriented film by kiss-roll coating in an amount of 2.7 g/m$^2$. Thereafter, the film was stretched to 3.8 times in a transverse direction at 120° C., heated at 225° C. and heated again at 215° C. while shrunk in a transverse direction by 6% to give a 4.5-μm-thick biaxially oriented polyester film. The temperature-dimensional change curve in a transverse direction of this film is shown in FIG. 2 and other characteristic properties are shown in Table 1. There was a point at which the gradient of the temperature-dimensional change curve in a transverse direction changes from a positive value to a negative value and the maximum value of dimensional change was 2.5%.

TABLE 1

| | | | Ex. 1 | Ex. 2 | C. Ex. 1 | C. Ex. 2 | C. Ex. 3 |
|---|---|---|---|---|---|---|---|
| center line average roughness | | (Ra) (μm) | 0.022 | 0.014 | 0.022 | 0.022 | 0.022 |
| refractive index | longitudinal direction | | 1.650 | 1.757 | 1.665 | 1.648 | 1.648 |
| | transverse direction | | 1.674 | 1.762 | 1.654 | 1.673 | 1.673 |
| F5 value | longitudinal direction | (kg/mm$^2$) | 12 | 14 | 12 | 12 | 12 |
| surface tension | | (dyne/cm) | 46 | 46 | 42 | 52 | 46 |
| degree of swelling | | (%) | 53 | 53 | — | 160 | 53 |
| ring and ball softening point | | (° C.) | 110 | 110 | — | 95 | 110 |
| adhesion 1 | | | 5 | 5 | 1 | 3 | 5 |
| overall evaluation | | | ○ | ○ | X | Δ | X |

Ex.: Example,
C. Ex.: Comparative Example
○: good,
Δ: limited use,
X : not usable

EXAMPLE 31

Figure 3:
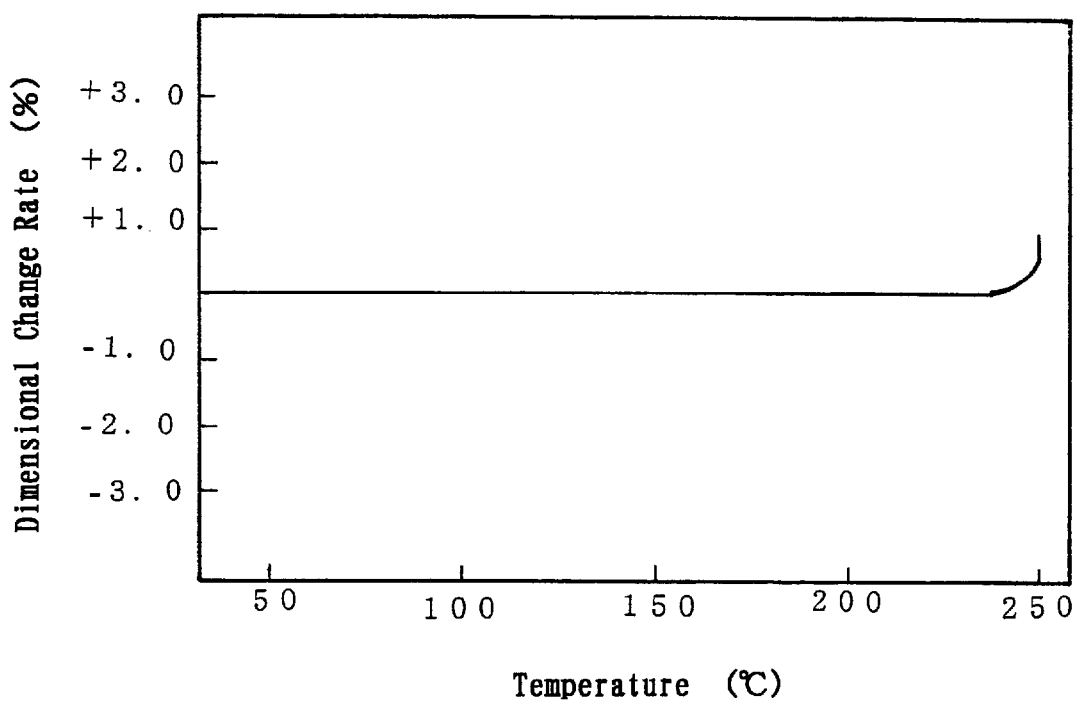
FIG. 3 shows the temperature-dimensional change curve in the transverse direction of a film obtained in Example 3 when temperature is elevated from 0 to 240° C.

Polyethylene terephthalate (containing a lubricant) having an intrinsic viscosity, measured in o-chlorophenol at 25° C., of 0.61 was extruded from a T die and quenched on a rotary cooling drum maintained at about 400° C. while static electricity was applied to the polyethylene terephthalate to give an unstretched film. The unstretched film was stretched to 3.6 times in a longitudinal direction at 115° C. to give a monoaxially oriented film. The coating solution 3 having a solid content of 3 wt % was applied to one side of this monoaxially oriented film by kiss-roll coating in an amount of 2.7 g/m². Thereafter, the film was stretched to 3.8 times in a transverse direction at 120° C., heated at 230° C. to be tense with a fixed length and heated again at 230° C. without stretching and shrinking in a transverse direction to give a 4.5-μm-thick biaxially oriented polyester film. The temperature-dimensional change curve in a transverse direction of this film is shown in FIG. 3 and other characteristic properties are shown in Table 2. There was no point at which the gradient of the temperature-dimensional change curve in a transverse direction changes from a positive value to a negative value and the maximum value of dimensional change was very small at 0.5% or less.

adhesive layer was not formed. The characteristic properties of this film are shown in Table 1.

Comparative Example 5

A film was formed in the same manner as in Example 1 to obtain a biaxially oriented polyester film except that the coating solution 4 was used in place of the coating solution 1. The characteristic properties of this film are shown in Table 1.

Comparative Example 6

A film was formed in the same manner as in Example 1 to obtain a biaxially oriented polyester film except that the coating solution 5 was used in place of the coating solution 1. The characteristic properties of this film are shown in Table 1.

TABLE 2

|  |  |  | Ex. 3 | Ex. 4 | C. Ex. 4 | C. Ex. 5 | C. Ex. 6 |
| --- | --- | --- | --- | --- | --- | --- | --- |
| center line average roughness |  | (Ra) (μm) | 0.022 | 0.014 | 0.022 | 0.022 | 0.022 |
| refractive index | longitudinal direction |  | 1.652 | 1.754 | 1.659 | 1.648 | 1.653 |
|  | transverse direction |  | 1.667 | 1.761 | 1.661 | 1.673 | 1.670 |
| F5 value | longitudinal direction | (kg/mm²) | 12 | 14 | 12 | 12 | 12 |
| surface tension |  | (dyne/cm) | 46 | 46 | 42 | 52 | 48 |
| degree of swelling |  | (%) | 53 | 53 | — | 160 | 120 |
| adhesion 1 |  |  | 5 | 5 | 1 | 5 | 5 |
| adhesion 2 |  |  | 5 | 5 | 1 | 1 | 5 |
| adhesion 3 |  |  | 5 | 5 | 1 | 1 | 5 |
| remarks |  |  |  |  |  |  | (Note 1) |
| overall evaluation |  |  | ○ | ○ | X | X | Δ |

Ex.: Example,
C. Ex.: Comparative Example
(Note 1)
difficult to use in production because of a short pot life of coating solution
○: good,
Δ: limited use,
X: not usable

EXAMPLE 4

Polyethylene-2,6-naphthalate (containing a lubricant) having an intrinsic viscosity, measured in o-chlorophenol at 25° C., of 0.61 was extruded from a T die and quenched on a rotary cooling drum maintained at about 40° C. while static electricity was applied to the polyethylene-2,6-naphthalate to give an unstretched film. The unstretched film was stretched to 3.6 times in a longitudinal direction at 125° C. to give a monoaxially oriented film. The coating solution 3 having a solid content of 3 wt % was applied to one side of this monoaxially oriented film by kiss-roll coating in an amount of 2.7 g/m². Thereafter, the film was stretched to 3.8 times in a transverse direction at 140° C., heated at 240° C. to be tense with a fixed length and heated again at 240° C. without stretching and shrinking in a transverse direction to give a 4.5-μm-thick biaxially oriented polyester film.

The characteristic properties of this film are shown in Table 2. The temperature-dimensional change curve in a transverse direction of this film is almost the same as that of Example 3 (FIG. 3) and the maximum value of dimensional change was very small at 0.5% or less.

Comparative Example 4

A film was formed in the same manner as in Example 3 to obtain a biaxially oriented polyester film except that an

What is claimed is:

1. An adhesive polyester film comprising:
   (a) a biaxially oriented polyester film base layer which has no point at which the gradient of its temperature-dimensional change curve changes from a positive value to a negative value when temperature is elevated from the glass transition temperature of the polyester to 240° C. and which does not show a dimensional change of more than 5%, and
   (b) an adhesive layer formed on at least one side of the base layer and comprising a resin selected from the group consisting of:
   (i) a water-soluble or water-dispersible resin of a polyester modified by a vinyl resin, and
   (ii) a crosslinked resin of a mixture of a water-soluble or water-dispersible acrylic resin, a water-soluble or water-dispersible polyester resin and an epoxy resin crosslinking agent.

2. The adhesive polyester film of claim 1, wherein the base layer has no point at which the gradient of its temperature-dimensional change curve changes from a positive value to a negative value when temperature is elevated from 0° C. to 240° C. and does not show a dimensional change of more than 5%.

3. The adhesive polyester film of claim 1, wherein there is no dimensional change of more than 2% in the temperature-dimensional change curve.

4. The adhesive polyester film of claim 1, wherein the gradient of the temperature-dimensional change curve lies between +0.02%/° C. and −0.02%/° C.

5. The adhesive polyester film of claim 1, wherein the thickness of the base layer is 0.5 to 10 µm.

6. The adhesive polyester film of claim 1, wherein the polyester of the base layer is polyethylene terephthalate.

7. The adhesive polyester film of claim 1, wherein the polyester of the base layer is polyethylene-2,6-naphthalene dicarboxylate.

8. The adhesive polyester film of claim 1, wherein the center line average roughness (Ra) of the adhesive layer is in the range of 0.01 to 1 µm.

9. The adhesive polyester film of claim 1, wherein the thickness of the adhesive layer is in the range of 0.001 to 1 µm.

10. The adhesive polyester film of claim 1, wherein the surface tension of the surface of the adhesive layer is in the range of 35 to 75 dyne/cm.

11. The adhesive polyester film of claim 1, wherein the degree of swelling of the adhesive layer to a mixed solvent consisting of methyl ethyl ketone and toluene in a weight ratio of 1:1 is in the range of 5 to 500%.

12. The adhesive polyester film of claim 1, wherein the ring and ball softening point of the adhesive layer is in the range of 50 to 250° C.

13. The adhesive polyester film of claim 1, wherein the water-soluble or water-dispersible resin of a polyester modified by a vinyl resin is produced by copolymerizing two or more vinyl monomers in an aqueous solution or dispersion of a polyester.

14. The adhesive polyester film of claim 1, wherein the mixture of a water-soluble or water-dispersible acrylic resin, a water-soluble or water-dispersible polyester resin and an epoxy resin crosslinking agent satisfies the following expressions (1) and (2):

$$0.25 \leq (A)/(B) \leq 4.0 \quad (1)$$

$$1.5 \leq (A)/(B) \cdot (C) \leq 199 \quad (2)$$

wherein (A), (B) and (C) signify parts by weight of the water-soluble or water-dispersible acrylic resin, parts by weight of the water-soluble or water-dispersible polyester resin and parts by weight of the epoxy resin crosslinking agent, respectively.

15. The adhesive polyester film of claim 1, wherein the water-soluble or water-dispersible acrylic resin is an acrylic resin having a hydroxyl group.

16. The adhesive polyester film of claim 1, wherein the epoxy resin crosslinking agent is a glycidylamine compound having at least one amino group and at least two glycidyl groups in a molecule.

17. The adhesive polyester film of claim 1, wherein the non-uniformity in the thickness in both longitudinal and transverse directions is in the range of 0 to 2%.

18. The adhesive polyester film of claim 1, wherein the refractive index of the film in both longitudinal and transverse directions is in the range of 1,600 to 1,800.

19. The adhesive polyester film of claim 1, wherein the F5 value of the film in a longitudinal direction is in the range of 10 to 16 kg/mm$^2$.

20. The adhesive polyester film of claim 1 which is for sublimation-type thermosensitive image transfer.

21. A method of using an adhesive polyester film to produce a sublimation thermosensitive image transfer film comprising forming a sublimation thermosensitive image transfer material layer on the adhesive layer of the adhesive polyester film of claim 1.

* * * * *

UNITED STATES PATENT AND TRADEMARK OFFICE
CERTIFICATE OF CORRECTION

PATENT NO.    : 6,391,441 B1
DATED         : May 21, 2002
INVENTOR(S)   : Shinji Yano, Masayuki Fukuda and Satoshi Kitazawa It is certified that error appears in the above-identified patent and that said Letters Patent is hereby corrected as shown below:

<u>Title page,</u>
Item [73], Assignee, should read as follows:

-- [73]  Assignees:  Teijin Limited, Osaka (JP) and
                     Dai Nippon Printing Co., Ltd., Tokyo (JP) --

Signed and Sealed this

Thirteenth Day of May, 2003

JAMES E. ROGAN
*Director of the United States Patent and Trademark Office*